(12) United States Patent
Chen

(10) Patent No.: US 6,234,938 B1
(45) Date of Patent: May 22, 2001

(54) MAGNETIC DEVICE FOR USE IN EXERCISE BICYCLE OR OTHER EXERCISE MACHINES

(76) Inventor: Lai-Hao Chen, No. 145, Chung Der Road, Shen Kang Hsian, Taichung Hsien (TW)

( * ) Notice: Subject to any disclaimer, the term of this patent is extended or adjusted under 35 U.S.C. 154(b) by 0 days.

(21) Appl. No.: 09/324,599

(22) Filed: Jun. 3, 1999

(51) Int. Cl.$^7$ .................................................. A63B 22/06
(52) U.S. Cl. .............................. 482/57; 482/63; 482/903; 188/161
(58) Field of Search .................................. 482/57, 61, 60, 482/63, 65, 903; 188/164, 161, 163, 158, 267

(56) References Cited

U.S. PATENT DOCUMENTS 3,995,491 * 12/1976 Wolfla, II ............................... 73/379
5,879,273 * 3/1999 Wei et al. .............................. 482/63

* cited by examiner

Primary Examiner—Jerome W. Donnelly
Assistant Examiner—Tam Nguyen
(74) Attorney, Agent, or Firm—Browdy & Neimark

(57) ABSTRACT

A magnetic device intended for use in an exercise bicycle or the like comprises a main body, a spindle mounted on the main body, two disks mounted on the spindle at an interval and provided with a plurality of magnets, and a threaded rod for adjusting the distance between the two disks so as to adjust the magnitude of resistance force by controlling the magnetic flux density between the two disks.

8 Claims, 5 Drawing Sheets

MAGNETIC DEVICE FOR USE IN EXERCISE BICYCLE OR OTHER EXERCISE MACHINES

FIELD OF THE INVENTION

The present invention relates generally to a magnetic damper, and more particularly to a magnetic device intended for use in an exercise bike or other exercise machines.

BACKGROUND OF THE INVENTION

There are a variety of dampers which are available in the market place today and are different in form and manufacturing principle. For example, certain dampers that are used in the exercise bike are provided with a rotary wheel and a belt by means of which the rotary wheel is tightened to bring about a resistance force. The belt is susceptible to wear or damage. There are also certain dampers which are provided with an electric motor to bring about a resistance force in conjunction with a ratchet wheel. Such electrically-operated dampers as described above are limited in use in that they are virtually useless without a power source.

SUMMARY OF THE INVENTION

The primary objective of the present invention is therefore to provide an exercise bike or machine with a damper capable of bringing about a resistance force without the use of friction force or electricity.

In keeping with the principle of the present invention, the foregoing objective of the present invention is attained by a magnetic device for generating a resistance force. The magnetic device comprises two disks which are each provided with a plurality of magnets for bringing about a resistance force by means of the attractive force and the repulsive force of the magnets. The magnitude of the resistance force is adjusted by the magnetic flux density of the magnets of the two disks.

The foregoing objective, features, functions, and advantages of the present invention will be more readily understood upon a thoughtful deliberation of the following detailed description of five preferred embodiments of the present invention with reference to the accompanying drawings.

DETAILED DESCRIPTION OF THE INVENTION

Figure 1:
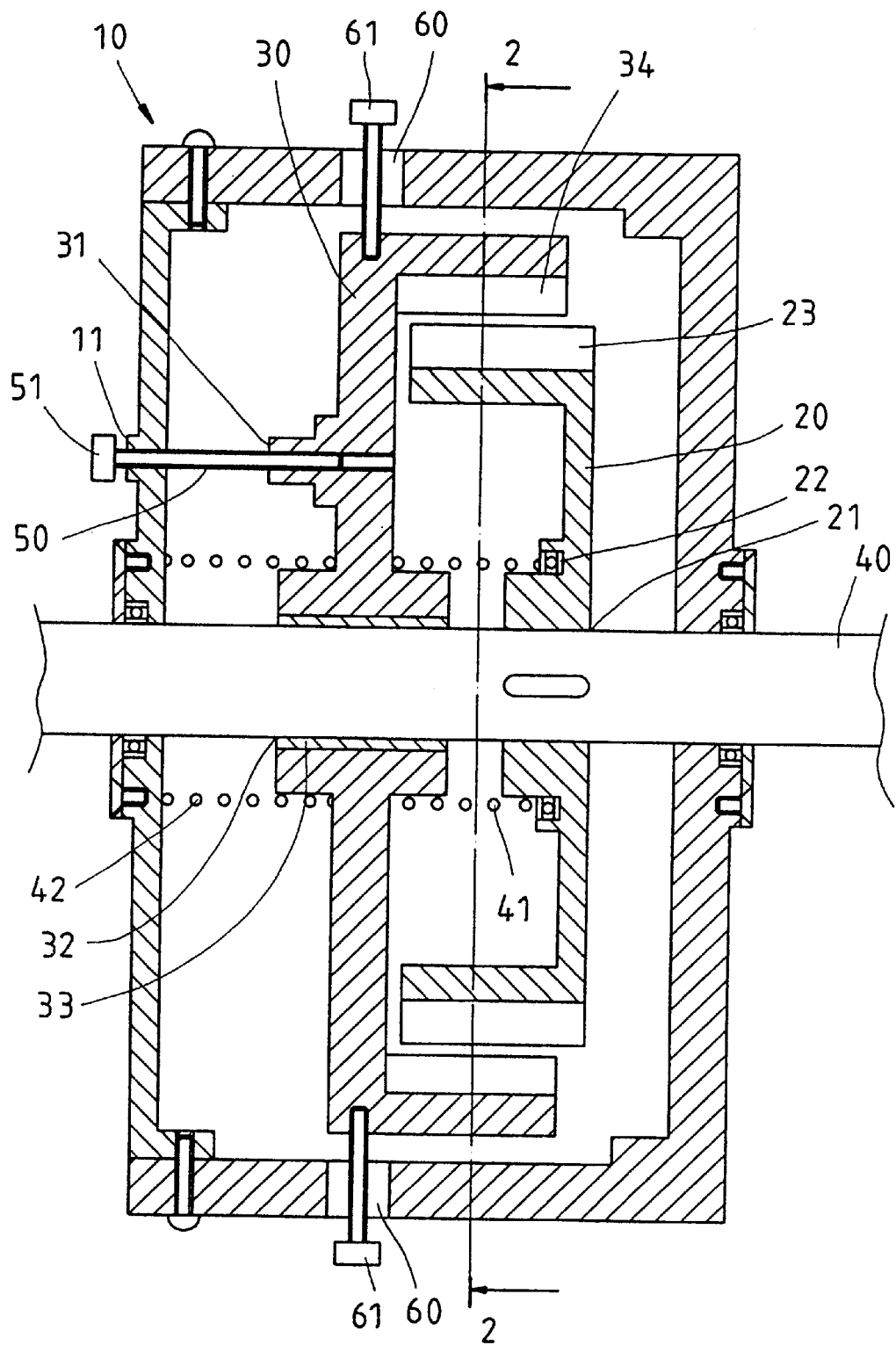
FIG. 1 shows a sectional view of a first preferred embodiment of the present invention.
Figure 2:
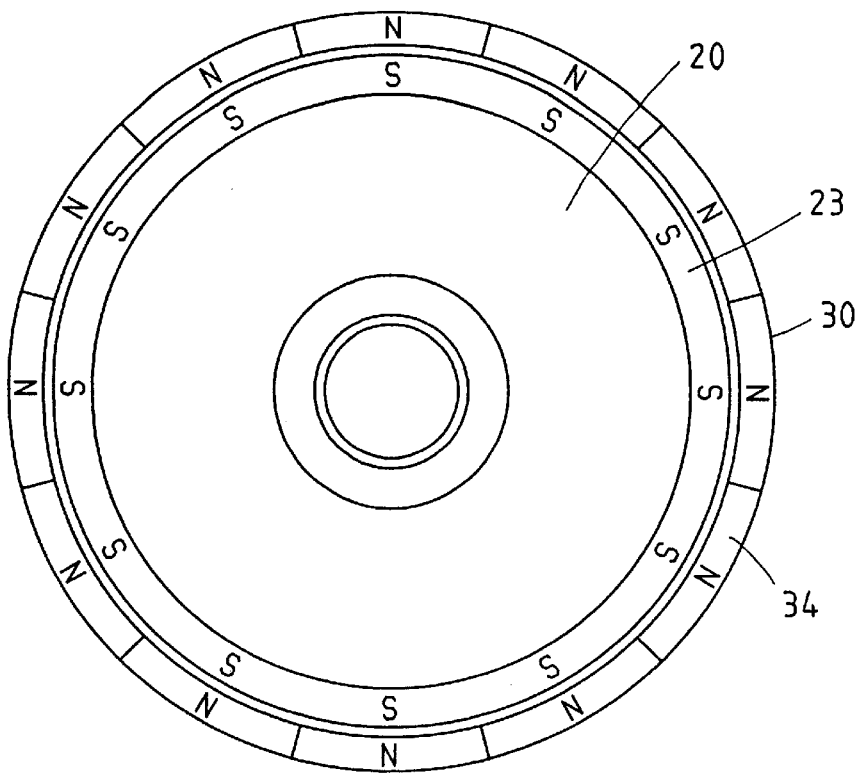
FIG. 2 shows a sectional view of a portion taken along the direction indicated by a line 2—2 as shown in FIG. 1.

As shown in FIGS. 1 and 2, a magnetic device of the first preferred embodiment of the present invention is intended for use in an exercise bike or other exercise machines. The magnetic device comprises the component parts which are described hereinafter.

A main body 10 is provided in one side thereof with a threaded hole 11.

A first disk 20 is provided at the center thereof with an axial hole 21 and a thrust bearing 22 fitted into the axial hole 21. The first disk 20 is provided along the peripheral edge thereof with a plurality of magnets 23 which are arranged end to end.

A second disk 30 is provided with a threaded hole 31, and at the center thereof with an axial hole 32 and a bearing 33 fitted into the axial hole 32. The second disk 30 is provided along the periphery thereof with a plurality of magnets 34 which are arranged end to end such that they are located on the outside of the magnets 23 and that they are separated from the magnets 23 by a distance.

A spindle 40 is fastened pivotally with the main body 10 such that the spindle 40 is received in the axial holes 21 and 31 to hold the first disk 20 and the second disk 30 in a manner that the first disk 20 and the second disk 30 are opposite and parallel to each other.

A first spring 41 is fitted over the spindle 40 such that the first spring 41 is located between the first disk 20 and the second disk 30.

A second spring 42 is fitted over the spindle 40 such that one end of the second spring 42 urges the second disk 30, and that other end of the second spring 42 urges the main body 10.

A control member 50 is a threaded rod 50 which is engaged with the threaded hole 11 of the main body 10 such that one end of the threaded rod 50 is engaged with the threaded hole 31 of the second disk 30, and that other end of the threaded rod 50 is provided with a rotary handle 51 capable of actuating the threaded rod 50 to displace, thereby actuating the second disk 30 to displace so as to control the distance between the first disk 20 and the second disk 30.

Two sliding sleeves 60 are movably fitted over the upper and the lower sides of the main body 10.

Two bolts 61 are fitted into the sliding sleeves 60 such that the two bolts 61 are fastened with the second disk 30 to prevent the second disk 30 from turning, and that the two sliding sleeves 60 move along with the second disk 30.

Figure 3:
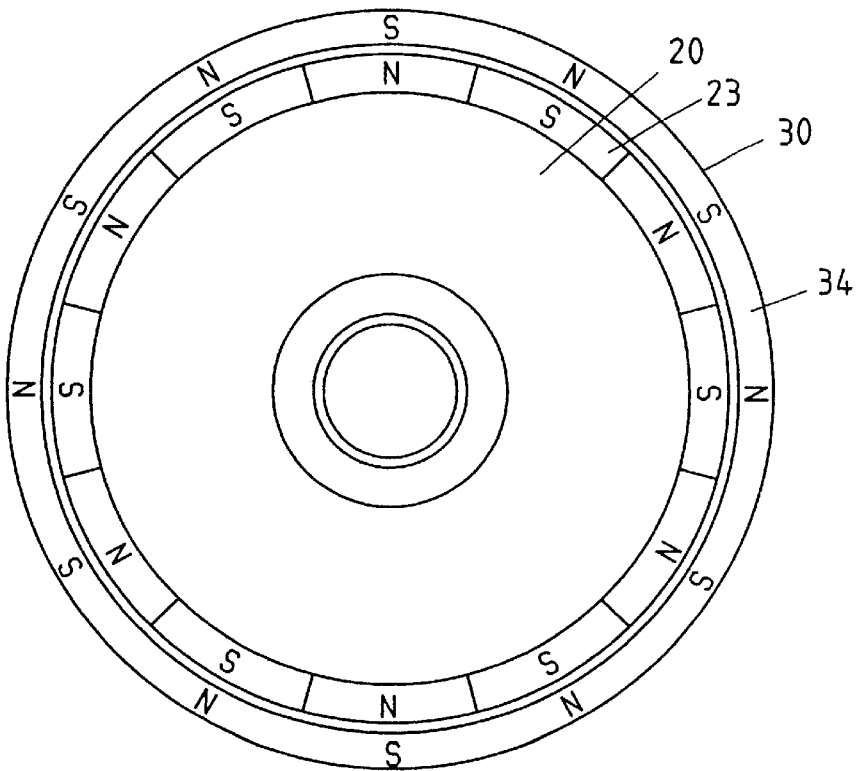
FIG. 3 shows a sectional view of a second preferred embodiment of the present invention, with the sectional view being taken in a manner similar to that of FIG. 2.

The magnetic device of the present invention is connected with an exercise bike or machine by the spindle 40. The magnets 23 of the first disk 20 and the magnets 34 of the second disk 30 are arranged in various ways. As shown in FIG. 2, the magnets 23 are so arranged that the S poles of the magnets 23 face outwards, whereas the magnets 34 are arranged such that the N poles of the magnets 34 face inward. As the handle 51 is turned by the user, the first disk 20 is actuated to move to be close to the second disk 30, thereby resulting in an increase in the magnetic force between the two disks 20 and 30. In light of the second disk 30 being fixed, the first disk 20 must overcome the magnetic force so as to turn. The magnitude of the resistance force is inversely proportional to the distance between the two disks 20 and 30. Now referring to FIG. 3, the magnets 23 and 34 are so arranged that the S poles and the N poles are arranged at interval, thereby resulting in the magnitude of the resistance force being strong and weak in an alternate manner so as to bring about a massaging effect.

Figure 4:
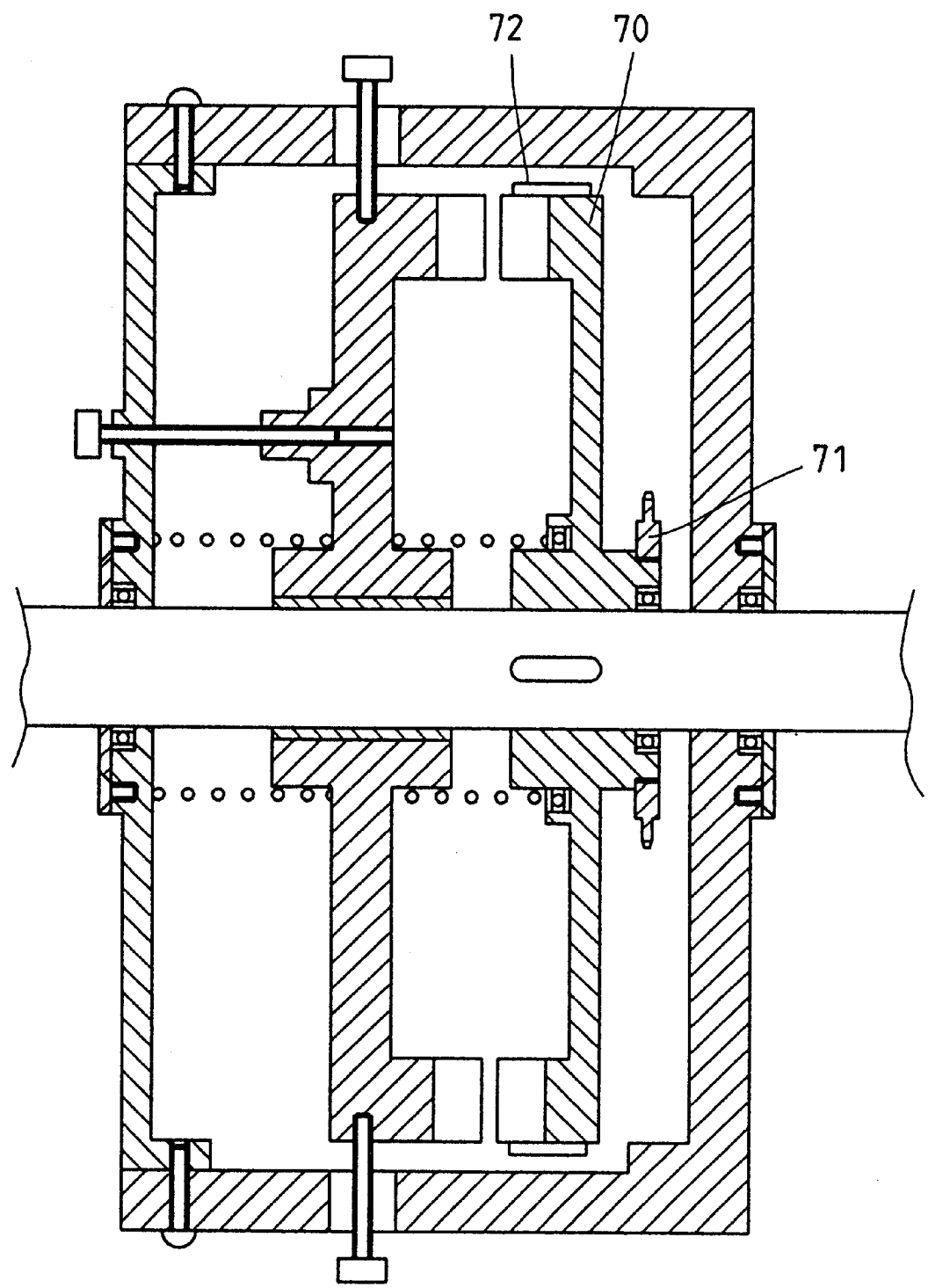
FIG. 4 shows a sectional view of a third preferred embodiment of the present invention.

As shown in FIG. 4, the third preferred embodiment of the present invention is basically similar to the first preferred embodiment of the present invention, with the difference being that the magnets of the first disk and the second disk are opposite and parallel to one another, and that the first disk 70 is provided with a geared disk 71 which rotates along with the first disk 70 and serves as a point to fasten pivotally with other devices, and further that the first disk 70 is provided with a resistance force member which is a friction belt 72 for regulating the revolving speed of the first disk 70.

Figure 5:
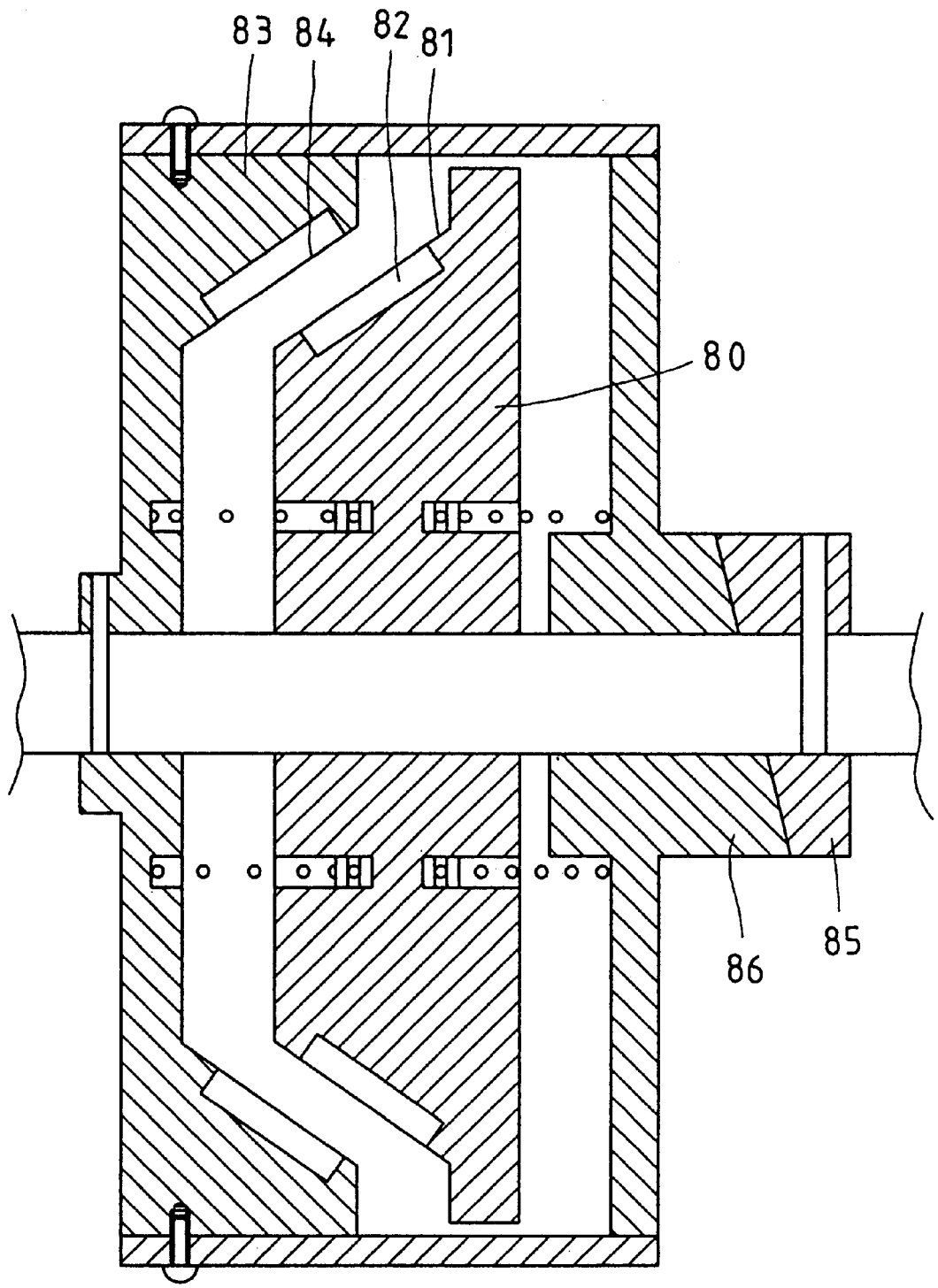
FIG. 5 shows a sectional view of a fourth preferred embodiment of the present invention.

As shown in FIG. 5, the fourth preferred embodiment of the present invention comprises a first disk 80 which is provided with a conical bevel 81 on which the magnets 82 are mounted, and a second disk 83 with a cross section which is provided with a recessed bevel 84 on which the magnets are mounted. The disk 83 is mounted fixedly on the spindle which is provided with a first bevel 85. The main body is also provided with a second bevel 86 which joins with the first bevel 85 to form various angles so as to control the distance between the two disks 80 and 83. As a result, the magnitude of the magnetic resistance force can be regulated.

Figure 6:
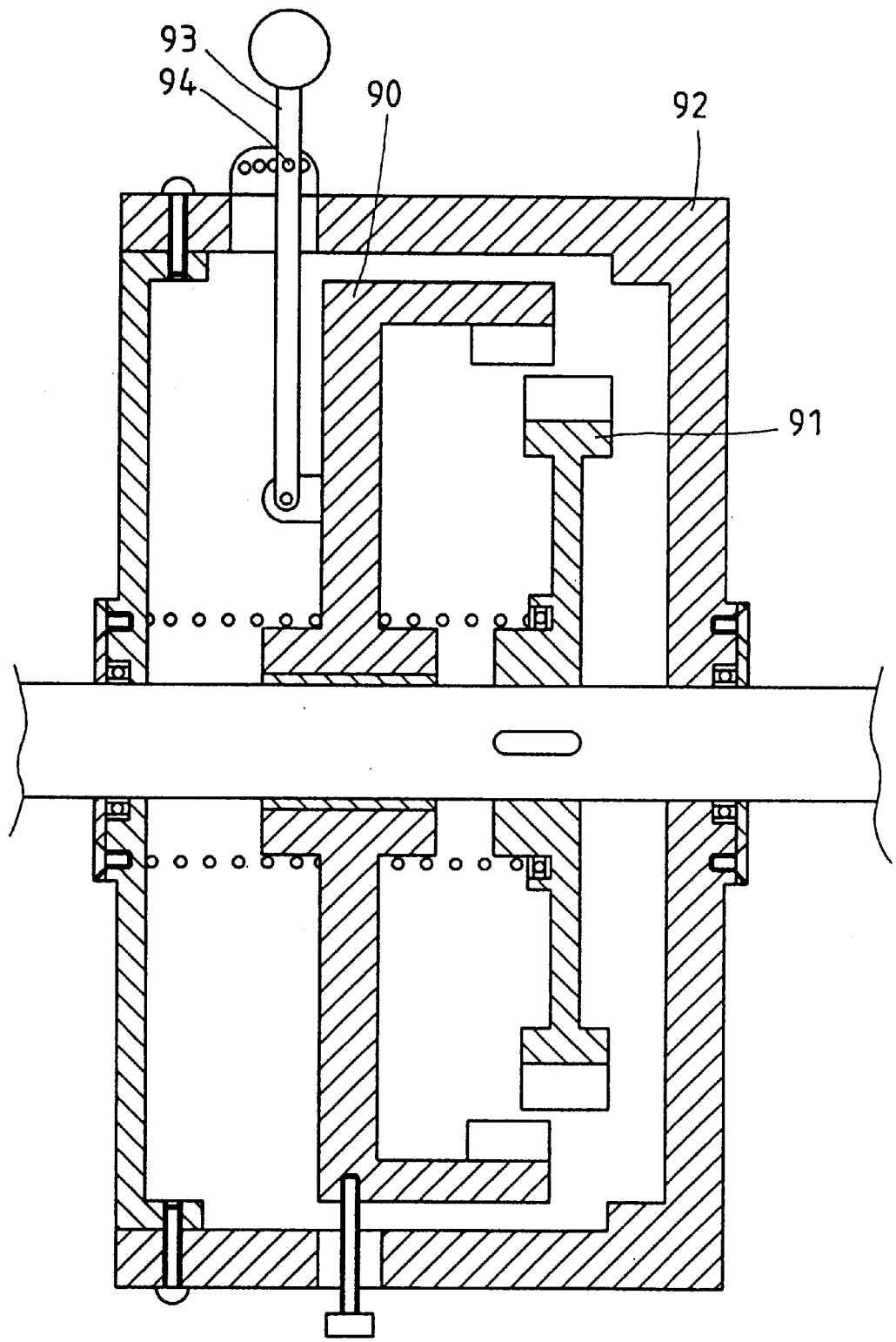
FIG. 6 shows a sectional view of a fifth preferred embodiment of the present invention.

The fifth preferred embodiment of the present invention comprises a first disk 91, a second disk 90, and a main body 92 which is provided with a control member 93, as shown in FIG. 6. The control member 93 has a pivoting portion 94 which is fastened pivotally with one side of the main body 92. The control member 93 is fastened pivotally at the bottom end thereof with the second disk 90. The control member 93 turns on the pivoting portion 94 serving as a pivot, so as to control and adjust the magnitude of the magnetic force between the first disk 91 and the second disk 90.

What is claimed is:

1. A magnetic device for use in an exercise bicycle or the like, said magnetic device comprising:

a main body;

at least one first disk which is provided with an axial hole, and a first plurality of magnets mounted along the periphery thereof;

a second disk provided with an axial hole corresponding in location to said axial hole of said first disk, and a plurality of second magnets mounted along the periphery thereof; and a spindle pivoted to said main body for mounting said first disk and said second disk at a distance such that said spindle is received in said axial holes of said first disk and said second disk, and that said magnets of said first disk and said second disk are respectively spaced apart opposite to one another with no intervening elements therebetween.

2. The magnetic device as defined in claim 1 further comprising a control member for controlling the distance between said first disk and said second disk.

3. The magnetic device as defined in claim 2, wherein said control member is a threaded rod which is mounted on said main body in such a manner that said threaded rod is fastened at one end thereof with said second disk, and that said threaded rod is fastened at other end thereof with a rotary handle for actuating said threaded rod to move said first disk toward or away from said second disk.

4. The magnetic device as defined in claim 1, wherein said spindle is provided with at least one spring fitted thereover such that said spring is located between said first disk and said second disk.

5. The magnetic device as defined in claim 1, wherein said first disk is provided with a resistance force member to retard motion of said first disk.

6. The magnetic device as defined in claim 5, wherein said resistance force member is a friction belt in contact with said first disk to regulate the revolving speed of said first disk.

7. The magnetic device as defined in claim 1, wherein poles of the first plurality of magnets facing opposite the second plurality of magnets are of an opposite polarity to poles of the second plurality of magnets.

8. The magnetic device as defined in claim 1, wherein poles of the first and second plurality of magnets which face opposite to one another alternate in polarity around each respective periphery to which the magnets are mounted.

* * * * *